United States Patent
Jåger et al.

(10) Patent No.: US 7,322,777 B2
(45) Date of Patent: Jan. 29, 2008

(54) REAMER WITH CLAMPING ARRANGEMENT FOR ADJUSTING CUTTING INSERT AND OTHER CUTTING TOOLS WITH CLAMPING ARRANGEMENTS FOR ADJUSTING CUTTING INSERTS

(75) Inventors: Horst Jåger, Nürnberg (DE); Berthold Zeug, Fürth (DE)

(73) Assignee: Kennametal Inc., Latrobe, PA (US)

( * ) Notice: Subject to any disclaimer, the term of this patent is extended or adjusted under 35 U.S.C. 154(b) by 643 days.

(21) Appl. No.: 10/394,500

(22) Filed: Mar. 21, 2003

(65) Prior Publication Data
US 2004/0028492 A1 Feb. 12, 2004

Related U.S. Application Data

(63) Continuation-in-part of application No. PCT/EP01/10945, filed on Sep. 21, 2001.

(30) Foreign Application Priority Data
Sep. 22, 2000 (DE) ................. 100 47 079

(51) Int. Cl.
B23B 29/02 (2006.01)
(52) U.S. Cl. ............. 408/153; 408/179; 408/713; 407/48
(58) Field of Classification Search ......... 408/153, 408/154, 161, 162, 179, 233, 713; 407/48, 407/87, 103, 104; B23B 29/02
See application file for complete search history.

(56) References Cited

U.S. PATENT DOCUMENTS 3,192,603 A * 7/1965 Greenleaf ............. 407/103
3,300,834 A * 1/1967 Stone .................. 407/35
3,341,923 A * 9/1967 Kelm .................. 407/104
3,371,397 A 3/1968 Coleshill et al.
3,996,651 A 12/1976 Heaton et al.
4,044,440 A * 8/1977 Stier .................. 407/105
4,204,781 A 5/1980 Johann
5,199,828 A * 4/1993 Forsberg et al. ......... 407/104
5,730,540 A 3/1998 Duran et al.
6,231,276 B1 * 5/2001 Muller et al. ........... 407/87
6,379,087 B1 * 4/2002 Alexander, IV ........ 407/107

FOREIGN PATENT DOCUMENTS

| DE | 2527413 | 12/1976 |
|---|---|---|
| DE | 8025087 | 9/1980 |
| DE | 3838816 | 5/1990 |
| EP | 0552774 | 7/1993 |
| FR | 1249497 | 12/1960 |

OTHER PUBLICATIONS

Pertinent page (1 page) from Applicant Submitted prior art (submitted Aug. 4, 2003), refer to the last two lines.*

* cited by examiner

*Primary Examiner*—Monica Carter
*Assistant Examiner*—Sara Addisu
(74) *Attorney, Agent, or Firm*—Nils H. Ljungman & Associates

(57) ABSTRACT

A cutting tool with a cutting insert and a pivotable screw and nut combination for holding the cutting insert. The cutting tool also has a feed mechanism to adjust the position of at least one cutting edge of the cutting insert in the cutting tool.

16 Claims, 7 Drawing Sheets

US 7,322,777 B2

REAMER WITH CLAMPING ARRANGEMENT FOR ADJUSTING CUTTING INSERT AND OTHER CUTTING TOOLS WITH CLAMPING ARRANGEMENTS FOR ADJUSTING CUTTING INSERTS

CONTINUING APPLICATION DATA

This application is a Continuation-In-Part application of International Patent Application No. PCT/EP01/10945, filed on Sep. 21, 2001, which claims priority from Federal Republic of Germany Patent Application No. 100 47 079.3, filed on Sep. 22, 2000. International Patent Application No. PCT/EP01/10945 was pending as of the filing date of this application. The United States was an elected state in International Patent Application No. PCT/EP01/10945.

BACKGROUND OF THE INVENTION

1. Field of the Invention

This invention relates to a cutting tool that can be realized in particular in the form of a rotary tool with a tool shank which acts as a support for a cutting insert in the form of a perforated plate, in particular a disposable perforated plate, and with a feed device as a means of adjustment for the positioning of the perforated plate on the tool shank. Stress applied by a simple screw is increasingly being used to fasten perforated plates of this type, in particular disposable perforated plates. In this case, the screw is used to fasten the perforated plate to the tool shank. The precise positioning of the perforated plate on the tool shank is thereby effected by adjustment means that apply pressure to the lateral contact surface of the perforated plate, which generates a position offset between the threaded hole and the screw head of the fastening screw. An adjustment means of this type is described in DE 197 17 741 A1, for example.

2. Background Information

An adjustable fixation of a perforated plate to the base body of the tool or tool shank at approximately a right angle to the axis of the hole can of course be realized economically. However, the tolerances between the contact surfaces and the threaded hole must be kept within narrow limits, so that the screw is not overloaded during the feed operation. On the other hand, the tolerances of the width of the perforated plate and the position of the contact surfaces in the plate seat of the tool shank limit the machining tolerances of the cutting tool, which means that on a boring tool in particular, the boring tolerance is likewise limited.

The development of cutting technology requires ever closer drilling tolerances. However, tool developments toward this objective can only be combined to a limited extent with the advantages of the screw bracing of a perforated plate. As the feed travel increases, the screw is subjected to an increasing bending load. This bending load represents a safety risk that can cause not only damage to the tool, the workpiece and the machine, but can also pose a threat to the operating personnel. EP 0 552 774 B1 describes, as one solution, a sled-like mounting of perforated plates on the tool shank with any desired feed travel. However, this solution weakens the substructure of the perforated plate seat and deforms the substructure when the perforated plate is braced.

OBJECT OF THE INVENTION

The object of the invention is to create a cutting tool of the type described above that in a novel way prevents an overloading of the screw connection even in the event of a longer feed travel.

SUMMARY OF THE INVENTION

This object is accomplished by a cutting tool with a tool shank (1) which supports a cutting insert in the form of a perforated plate (3), in particular a disposable perforated plate made of a hard cutting material, e.g. tungsten carbide or oxide ceramic, with a feed device (11) that acts transverse to the axis (10) of the hole in the feed direction (9) on the perforated plate (3) as an adjustment means for the positioning of the perforated plate (3) on the tool shank (1), and with a screw (17) that projects through the plate hole (19) of the perforated plate and with its screw head (23) braces the perforated plate (3) against a contact surface (5) on the tool shank (1) and, projecting through a bolt hole (22) of the tool shank (1), is engaged with its screw thread (20) in the nut thread (21) of a retaining lock nut (18), which retaining lock nut (18) is supported on the side facing away from the perforated plate seat (4) against the screw pressure (15) and so that it cannot rotate around the screw axis (10) on the tool shank, whereby the mutual stop surfaces of the screw head (23) and the perforated plate (3) on the one hand and of the retaining lock nut (18) and tool shank (1) on the other hand, as a result of their shapes, permit a mobility that follows the feed movement, in particular a rotational mobility of the screw fastener means that are fastened to each other (screw 17; retaining lock nut 18) with respect to the tool shank (1) and with respect to the perforated plate (3). Instead of an internal thread applied directly in the tool shank or instead of a movable, guided, sled-like mounting of the internal thread, this solution works with a retaining lock nut that is mounted so that it can to a certain extent float in the tool shank underneath the plate seat. The resulting floating mounting of the unit that consists of the nut and the inserted screw, which unit forms the screw bracing means, makes possible an automatic adjustment of the positioning and orientation of the screw thread axis relative to the axis of the perforated plate and to the axis of the bolt hole in the tool shank. The feed motion, which also allows a partial swiveling and/or rotation, occurs approximately in a plane that is defined by the screw thread axis, the orientation of which is variable, and by the feed direction that runs transverse to it.

One development of the object of the invention provides flexibility in the positioning of the backstop in and/or opposite to the feed direction. If the adjustable lateral stop surface is displaced toward the perforated plate, the retaining lock nut follows the adjustment movement opposite to the spring pressure. The purpose is to counteract an additional bending load of the screw caused by the adjustment movement. When the stop surface is retracted and when the perforated plate is replaced, the result is an automatic resetting or reverse pivoting of the retaining lock nut into its initial position.

The above-discussed embodiments of the present invention will be described further hereinbelow. When the word "invention" is used in this specification, the word "invention" includes "inventions", that is the plural of "invention". By stating "invention", the Applicant does not in any way admit that the present application does not include, more than one patentably and non-obviously distinct invention, and maintains that this application may include more than one patentably and non-obviously distinct invention. The Applicant hereby asserts that the disclosure of this application may include more than one invention, and, in the event that there is more than one invention, that these inventions may be patentable and non-obvious one with respect to the other.

BRIEF DESCRIPTION OF THE DRAWINGS

The object of the invention is explained in greater detail below and with reference to the exemplary embodiment illustrated in the accompanying figures, in which.

DESCRIPTION OF THE PREFERRED EMBODIMENT

Figure 1:
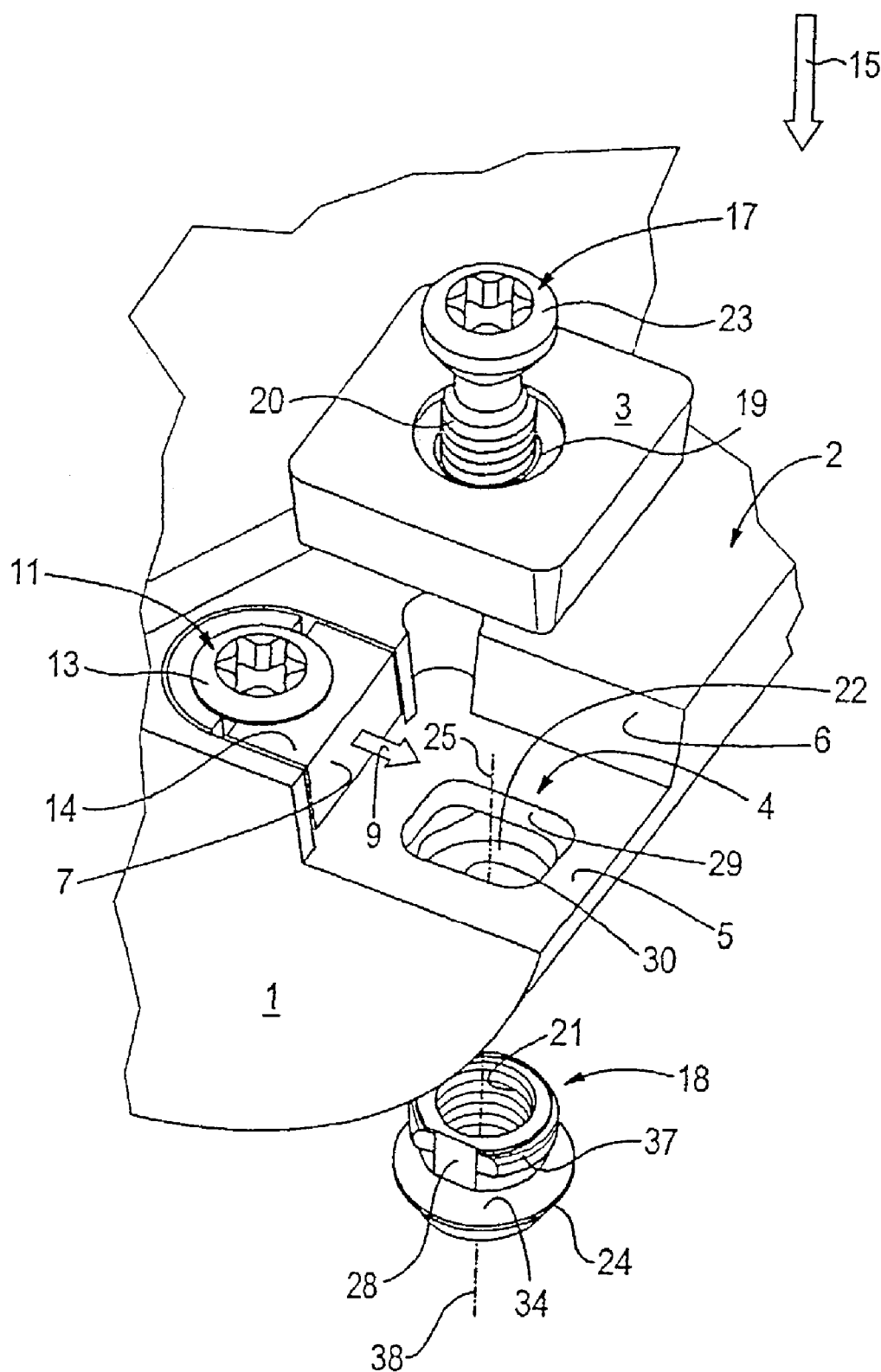
FIG. 1 is an exploded view in perspective of the tool shank with its plate seat for the cutting tool.
Figure 3:
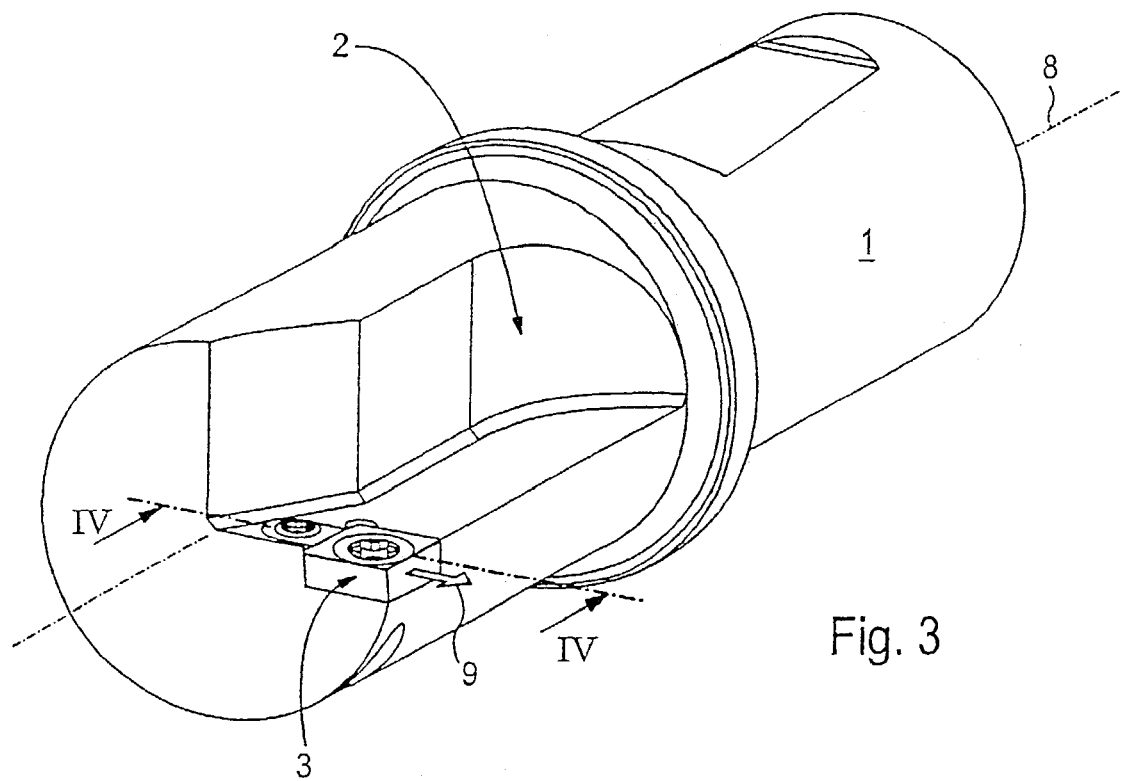
FIG. 3 is a front view in perspective of a rotary tool with a perforated plate fixed as taught by the invention.

The drilling tool (FIG. 3) contains essentially the tool shank 1 and, braced in it, a perforated plate 3 made of tungsten carbide metal or oxide ceramic material. The perforated plate 3 is braced inside the plate seat 4 provided in a shank recess 2 on the tool shank 1 (FIG. 1). The plate seat.4 contains a contact surface 5 and two lateral stop surfaces 6 and 7 for the precise positioning of the perforated plate 3. The lateral stop surface 6 thereby runs approximately perpendicular and the lateral stop surface 7 runs approximately parallel to the axis of rotation 8 of the tool shank 1.

The lateral stop surface 7 which is approximately parallel to the axis of rotation 8 can be adjusted in the feed direction 9 with respect to the tool shank 1. The feed direction 9 runs approximately perpendicular to the axis of rotation 8 of the tool shank 1 and to the hole axis 10 of the perforated plate 3. The primary purpose of the feed is to adjust the radial position of the perforated plate 3 inside its plate seat 4.

The change in position of the perforated plate 3 with, respect to its lateral stop surface 7 in the feed direction 9 is accomplished by a feed device 11, the construction and functional effect of which are approximately the same as the object of DE 197 17 741 A1. To avoid needless repetition, reference is made to the disclosure of the above referenced patent. All that is necessary to understand this invention is a brief explanation of the function of the feed device 11.

The essential functional part of the feed device 11 is a screw pin 13 with a conical feed head 12 on its upper end. With this conical feed head 12, the screw pin 13 can be screwed into the tool shank 1. During the insertion movement, the conical feed head 12 displaces a feed tab 14 of the feed device 11 in the feed direction 9. The flank of the feed tab 14 that faces away from the conical feed head 12 forms the adjustable lateral stop surface 7 of the feed device 11. The screwing of the screw pin 13 into the feed device 11 therefore causes the movement of the feed tab 14 with its lateral contact surface 7 in the feed direction 9 against the perforated plate 3.

The fixation of the perforated plate 3 inside the plate seat 4, namely its bracing in the bracing direction 15 against the contact surface 5 of the plate seat 4, is accomplished by separate screw connection means. These means comprise a screw 17 and the retaining lock nut 18 into which the screw 17 is screwed. The screw 17 runs through the plate hole 19 of the perforated plate 3 and the bolt hole 22 of the tool shank 1. The screw 17 is engaged with its screw thread 20 in the nut thread 21 of the retaining lock nut 18. The retaining lock nut 18 is positioned with its head 24 beneath the bolt hole 22.

When the perforated plate 3 comes into contact with the contact surface 5 of the plate seat 4, the screw 17 applies pressure with its screw head 23 to the perforated plate 3 in the bracing direction 15. The screw 17 is thereby screwed into the retaining lock nut 18 and the retaining lock nut 18 applies pressure with its head 24 on the tool shank 1 on its side facing away from the perforated plate seat 4, opposite to the screw pressure, i.e. opposite to the bracing direction 15 of the screw 17. The retaining lock nut 18 is held so that it cannot rotate around the screw thread axis 38 with respect to the tool shank 1. The retaining lock nut 18 lies with a loose fit in the bolt hole 22 of the tool shank 1. This loose fit acts in particular in or opposite to the feed direction 9. Consequently the retaining lock nut 18 is guided so that it can move in the bolt hole 22 of the tool shank 1 as well as transverse to the hole axis 10 or transverse to the hole axis 25 both in the feed direction 9 of the perforated plate 3 and also in the direction opposite to it.

The threaded portion 26 of the retaining lock nut 18 contains two rotation guides that are parallel to each other in the form of flank planes 27, 28 diametrically opposite each other and parallel to each other. These flank planes 27, 28 are tangent to corresponding rotation guidance planes 29 and 30 that are oriented parallel to them in the external surface area of the bolt hole 22. The rotation guidance planes 29, 30 preferably run parallel to the axis 10 of the bolt hole 22.

The screw head 23 has an approximately conical shape that tapers in the insertion direction 15. The screw head applies pressure with its head flank 31 which tapers in the insertion direction 15 and forms the conical external surface, against the surface of the plate hole 19 which also tapers in terms of its inside diameter in the insertion direction 15. Thereby at least one of the two mutual contact surfaces, namely the surface of the conical generated surface of the head flank 31 and/or the external surface 32 of the plate hole 19 which tapers with regard to its inside diameter in the insertion direction 15, is slightly concave. This configuration particularly promotes the somewhat floating rotational mobility of the two screw fastening means 17, 18 in the plane of rotational mobility defined by the feed direction 9 of the adjustment means 11 and by the screw thread axis 38, and which is also flanked on both sides by the two rotation guidance planes 29, 30 of the bolt hole 22 in the tool shank.

There may possibly be other shapes, in addition to the conical generated surface of the head flank 31 and/or the external surface 32 of the plate hole 19, which should also permit pivoting of the screw 17 about the axis 10, while still permitting the screw 17 to hold the perforated plate 3 in place.

Figure 5:
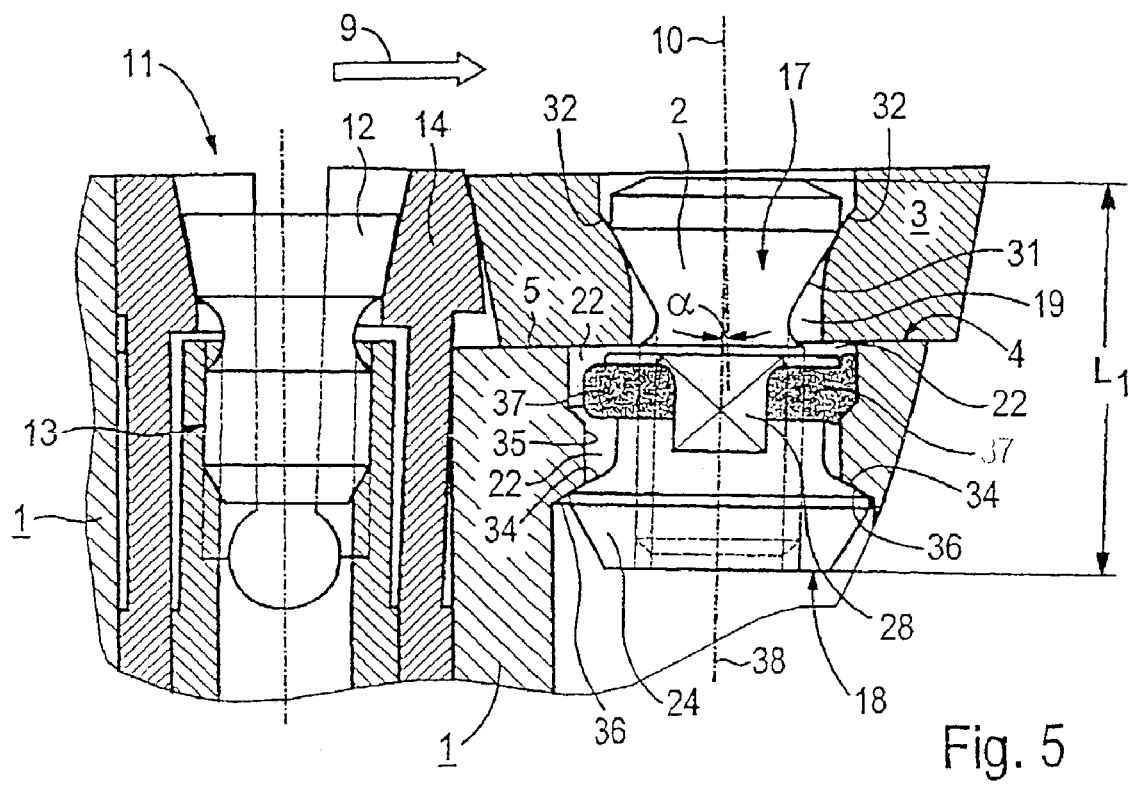
FIG. 5 is a sectional view analogous to FIG. 4 with the perforated plate adjusted in the feed direction.
Figure 5A:
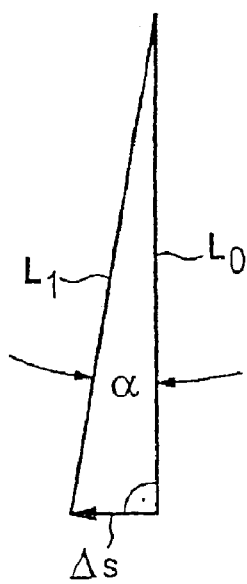
FIG. 5a is a vector diagram to illustrate the stress conditions in different adjustment positions of the screw and of the retaining lock nut that interacts with it.
Figure 5B:
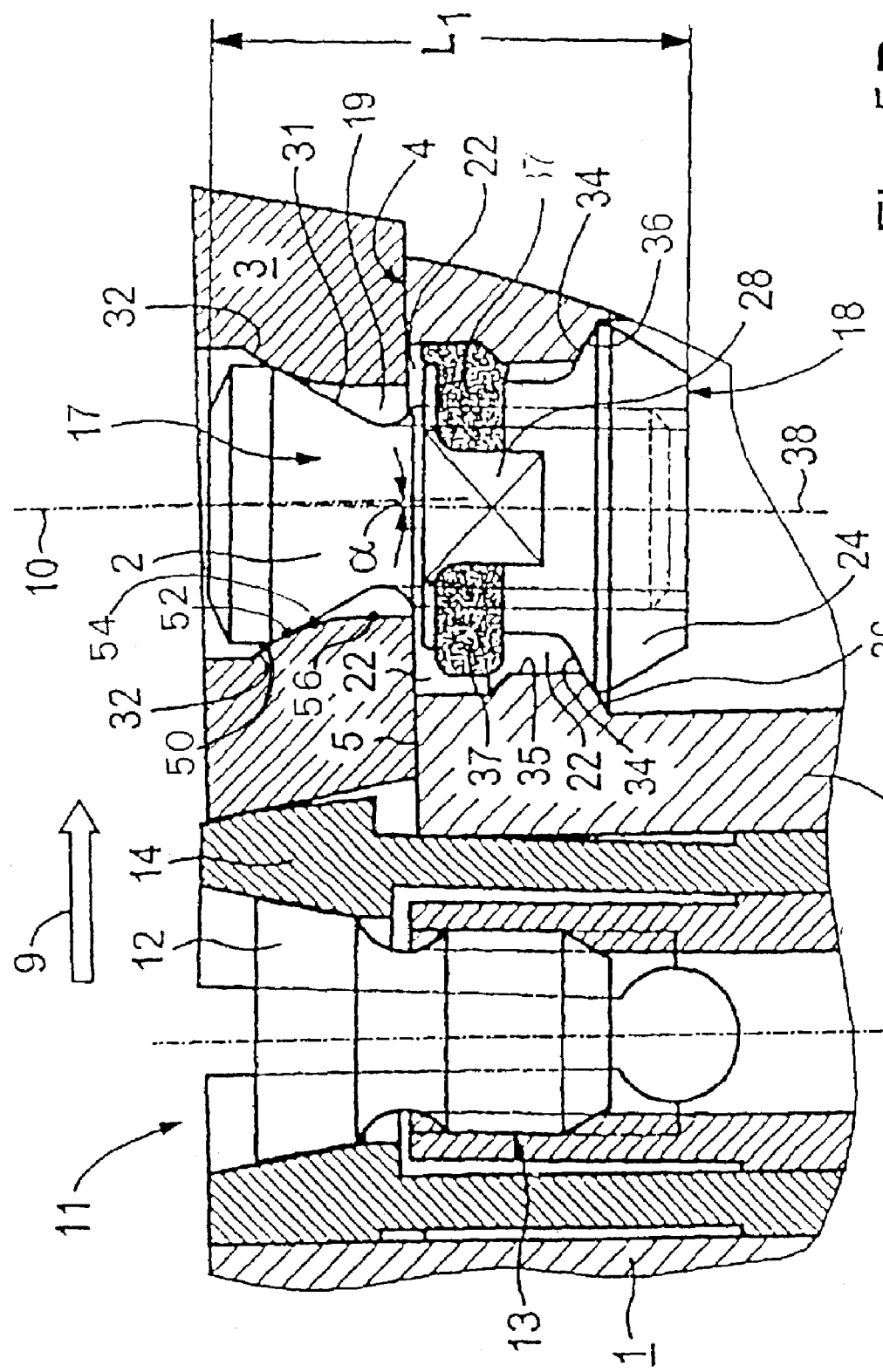
FIG. 5B is an enlarged version of the sectional view shown in FIG. 5 with the perforated plate adjusted in the feed direction.

With reference to FIG. 5B, the curve of the external surface 32 of the plate hole 19, has a relatively large radius at the point 50, which is shown at the top of the curve of the external surface 32 of the plate hole 19, compared to the radius at the point 52. Beyond the point 50, with regard to the insertion direction 15, the radius at the point 52, which is shown in FIG. 5B at the middle of the curve of the external surface 32 of the plate hole 19, preferably is somewhat or substantially smaller than the radius at point 50. Beyond the point 52, with regard to the insertion direction 15, the radius at the point 54, which is shown in FIG. 5B in the middle of the curve of the external surface 32 of the plate hole 19, preferably is somewhat or substantially larger than at point 52. Beyond the point 54 on the external surface 32 with regard to the insertion direction 15, the curve of the external surface 32 preferably becomes essentially vertical at point 56, which is shown in FIG. 5B at the bottom of the curve of the external surface 32 of the plate hole 19.

In another possible embodiment of the present invention, the external surface 32 of the plate hole 19 could possibly be a segmented curve rather than smooth curve.

In yet another possible embodiment of the present invention, the external surface 32 of the plate hole 19 could possibly be more or less curved than the external surface 32 described in the preferred embodiment.

In still another possible embodiment of the present invention, the retaining lock nut 18 and the screw 17 could possibly be reversed, positioning the retaining lock nut 18 above the screw 17 with respect to the reamer body 1.

All of the patents, patent applications and publications recited herein, and in the Declaration attached hereto, are hereby incorporated by reference as if set forth in their entirety herein.

Figure 5C:
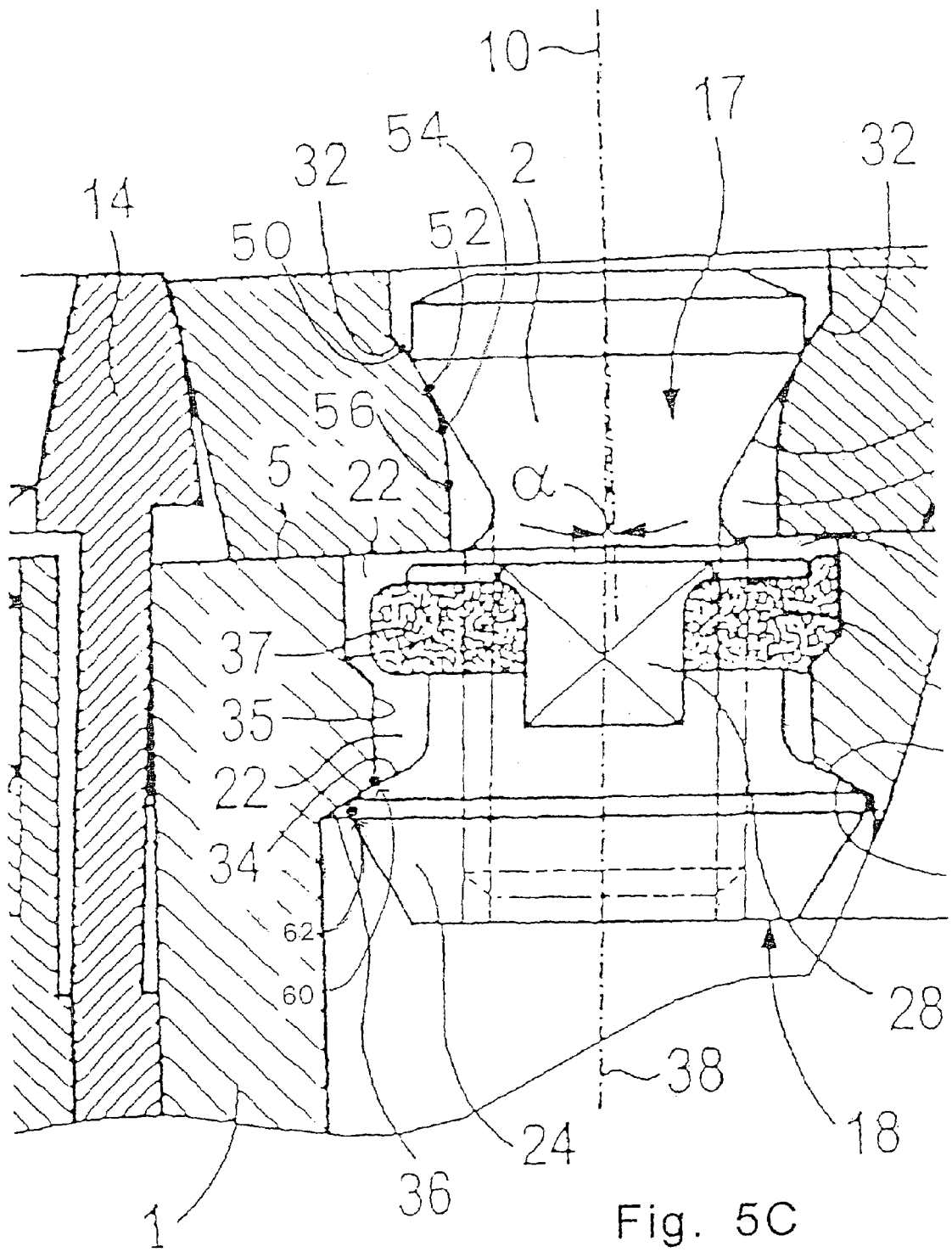
FIG. 5C is an enlarged version of the sectional view shown in FIG. 5 with the perforated plate adjusted in the feed direction.
Figure 6:
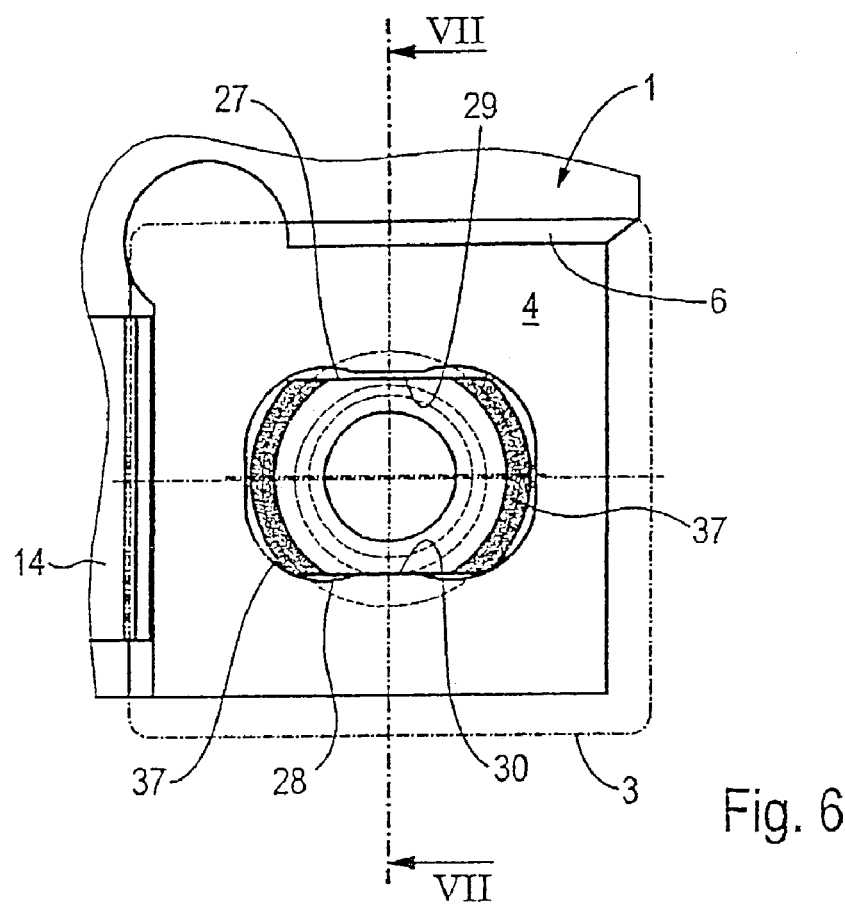
FIG. 6 is an overhead view, with the perforated plate removed and the screw removed, showing only the plate seat of the tool base body with the retaining lock nut positioned underneath the bolt hole corresponding to the view along VI in FIG. 4.
Figure 7:
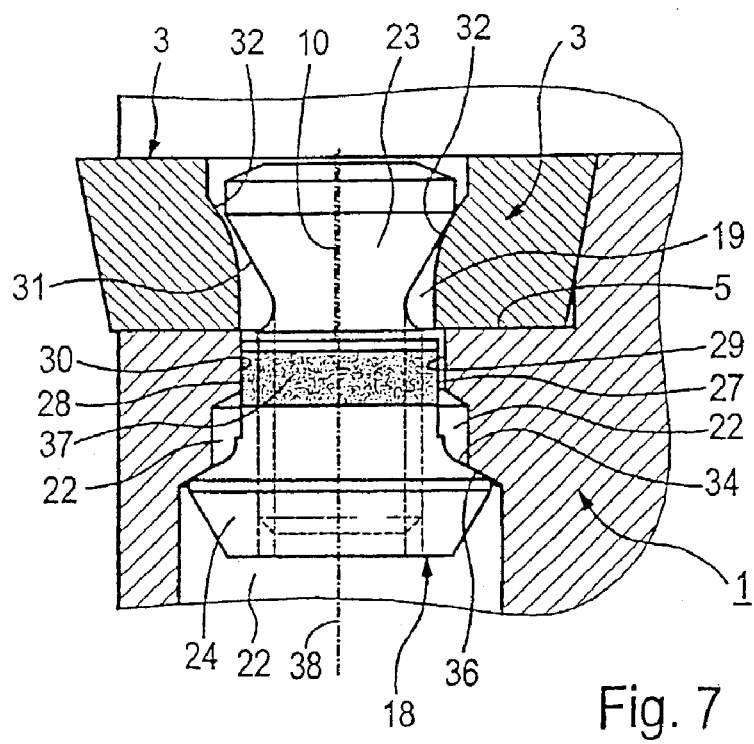
FIG. 7 is a sectional view along line VII-VII in FIG. 6, but with a perforated plate lying braced in the shank recess, analogous to FIG. 5.

In reference to FIG. 5C, in another possible embodiment of the present invention, the area 60 on the stop projection 35 could possibly comprise a concave or convex curve, either slightly or greatly, to permit the screw 17 to pivot about the axis 10. In yet another possible embodiment, the head 24 of the retaining lock nut 18 could possibly comprise a concave or convex curve around the area 62 on lock nut 18, shown in FIG. 5C, to permit the screw 17 to pivot about the axis 10.

All of the references and documents, cited in any of the documents cited herein, are hereby incorporated by reference as if set forth in their entirety herein. All of the documents cited herein, referred to in the immediately preceding sentence, include all of the patents, patent applications and publications cited anywhere in the present application.

Figure 2:
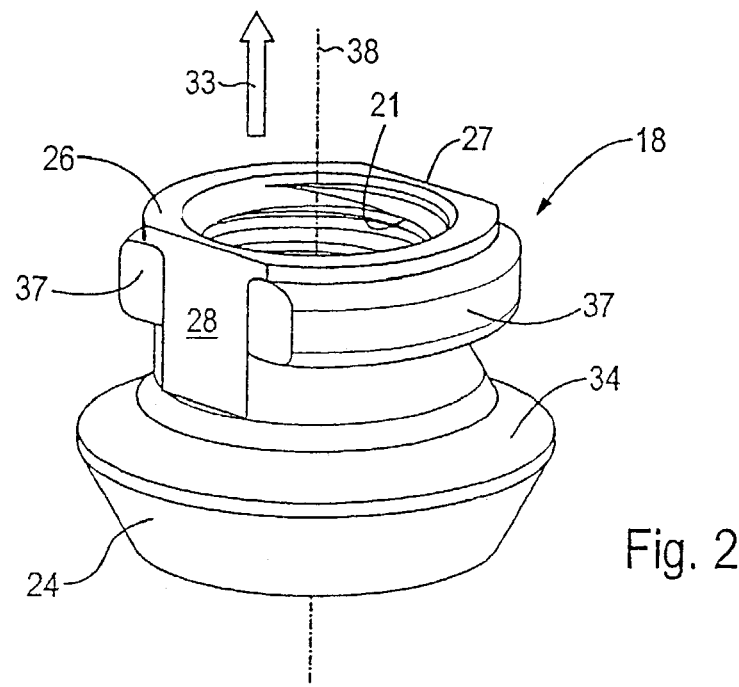
FIG. 2 is a view in perspective of the retaining lock nut for the feed screw.

The head 24 of the retaining lock nut 18 presses with its annular flank 34 against two stop projections 35 which are positioned diametrically opposite each other and project radially into the bolt hole 22 of the tool shank 1 in the form of axial stops from below in a stop direction 33 (FIG. 2) that is opposite to the bracing direction 15. The annular flank 34 of the retaining lock nut 18 tapers in the stop direction 33 of the retaining lock nut 18 opposite to the bracing direction 15 of the screw 17. The annular flank 34 of the retaining lock nut 18 forms an approximately conical generated surface. At least the annular flanks 34 of the retaining lock nut 18 of the respective opposite flanks 36 of the stop projections 35 are concave or convex.

The concave configuration of the mutual contact surfaces at least of the screw head 23 and of the external surface 32 of the hole of the perforated plate 3 on the one hand and/or of the head 24 of the retaining lock nut 18 and the stop projections 35 of the bolt hole 22 in the tool shank 1 against which the head 24 presses promote an automatic adjustment of the positioning of the screw fastening means (screw 17 and retaining lock nut 18) by their corresponding pivoting and/or rotation with respect to the tool shank 1, which largely eliminates any bending loads on the screw 17.

Figure 4:
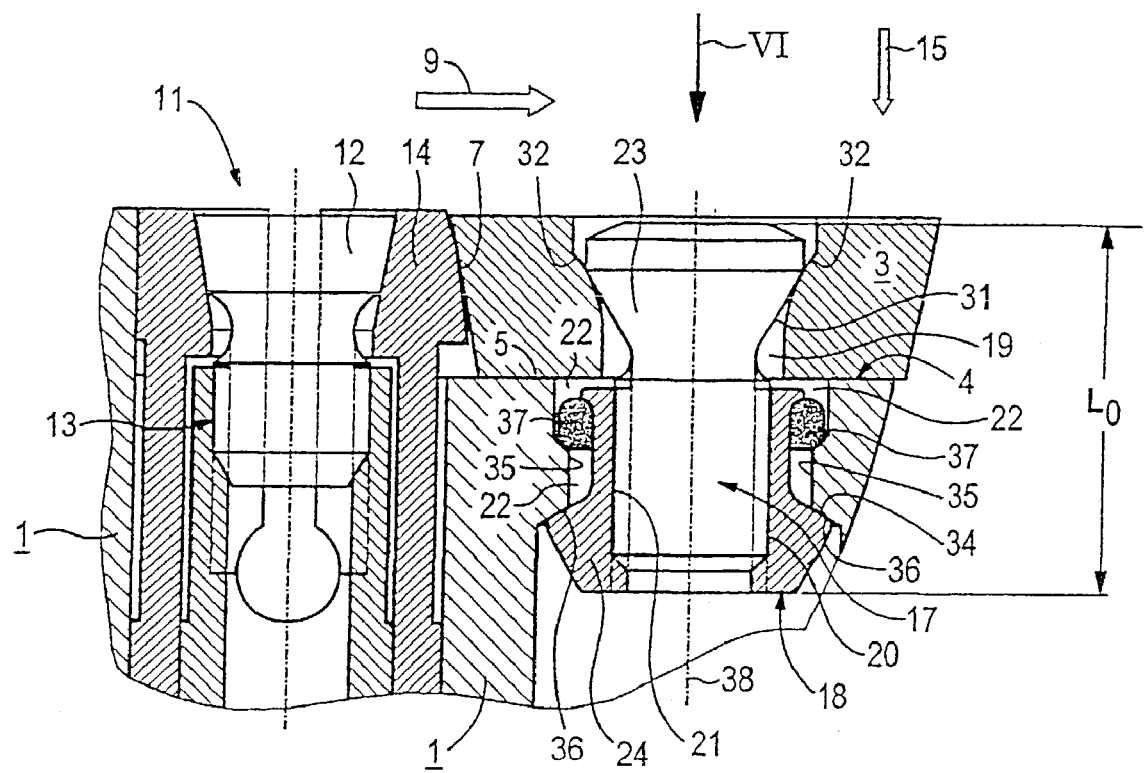
FIG. 4 is a longitudinal section along line IV-IV in FIG. 3 in the starting position of the perforated plate bracing without a feed pressure applied transverse to the hole axis on the perforated plate.

FIG. 5a shows the stress relationships between the screw 17 and the retaining lock nut 18 as the screw fastening means on one hand and the tool shank 1, i.e. its stop projections 35, on the other hand. These parts, which are braced with each other, and the principle of their interaction is illustrated particularly clearly in FIGS. 4 and 5. In the initial condition of the perforated plate spanning (FIG. 4), the pre-stress between the screw fastening means (screw 17 and retaining lock nut 18) on one hand and the stop projections 35 on the other hand corresponds to the stress vector $L_0$ (FIG. 4, 5a). The feed initiated by the feed tab 14 of the feed device 11 in the feed direction 9 causes a rotation of the screw thread axis 38 of the screw fastening means (screw 17) and retaining lock nut 18 with respect to the axis 10 of the plate hole by the angle a (FIG. 5). The pre-stress of the screw fastening means (screw 17, retaining lock nut 18) with respect to the stop projections 35 therefore increases. The increased pre-stress corresponds to the stress vector $L_1$ (FIG. 5a). In FIG. 5a, the feed motion and the feed travel of the lower end of the screw thread axis 38 (FIG. 5) are indicated by the positioning vector Ds.

The elements that simplify the feed motion are spring elements 37 fixed to the backstop 24 and positioned above the annular shoulder, which can be compressed or can expand opposite to and/or in the direction 9 of the pressure applied by the feed device 11. The spring elements 37 are rubber-like or elastomer moldings which individually, each in the manner of a bead-like ring segment, surround the areas of the shank 26 of the retaining lock nut 18 lying outside the two flanks 27, 28 like ring segments.

The two ring-segment-like spring elements 37, as a result of their positioning on the side of the annular shoulder 35 away from the backstop head 24, in the installed position also form a retaining collar of the retaining lock nut 18 with respect to the tool shank 1.

For the fixation of the perforated plate 3 on the tool shank 1, the perforated plate 3 is first placed on the plate seat 4 and fixed by the screw fastening means to the tool shank 1, which means consist of the screw 17 and the retaining lock nut 18. The screw 17 thereby lies with its head 23 in the plate hole 19 and projects with its shank that has the screw thread 20 through the hole 22 of the tool shank 1. Its screw thread 20 is screwed into the nut thread 21 of the retaining lock nut 18 that projects from below into the bolt hole 22 of the tool shank 1 at some distance from the stop projections 35 until the perforated plate 2 is braced at least under slight frictional pressure against the plate seat 4 (FIG. 4). Then the perforated plate 3 is definitively positioned in the feed direction 9 by screwing the screw pin 13 into the tool shank 1. Its conical feed head 12 thereby deflects the feed tab 14 that is in contact with the adjacent exposed surface of the perforated plate 3 in the feed direction 9 (FIG. 5). The feed movement is not blocked by the only slight frictional fixing, which has not yet been definitively tightened, of the perforated plate 3 between the screw head 23 and the head 24 of the retaining lock nut. The unit formed by the screw 17 and the retaining lock nut 18 can be pivoted, on account of the convex shape of the flank 34 of the retaining lock nut and of the mating flanks 36 of the stop projections 35, together with the convex external surface 32 of the hole of the perforated plate 3 and of the head flank 31 of the screw head 23, i.e. so that it floats to a certain extent, into a frictionally-engaged final position on the tool shank 1. The assumption of this position is permitted or promoted by the rotational mobility of the braced screw fastening means 17, 18 in the feed direction 9. The definitive screw fixation can be accomplished after the final adjustment.

In one possible embodiment, the invention relates to a chip removing tool comprising a tool shank (1) which acts as a support for a perforated plate (3). The perforated plate (3) is tensed by means of a screw connection passing through the orifice (19) of the perforated plate (3) and a through hole (22) of the tool shank (1), containing a screw (17) which is introduced from the side of the perforated plate, and a corresponding nut (18) positioned beneath the tool shank (1) inside the seat (4) of the tool shank (1). The tensed perforated plate (3) is adjusted in an effective manner in a direction of adjustment (3) which is substantially radial in relation to the axis of rotation (8) of the tool shank (1), whereby the contact surfaces between a) the screw head (23) and the perforated plate (3) and b) the head (24) of the corresponding nut (18) and the tool shank (1) enable a pivotable movement of the screw connection following on from the adjustment movement, said screw connection consisting of a screw (17) and a corresponding nut (18), as a result of crowning.

The components disclosed in the various publications, disclosed or incorporated by reference herein, may be used in the embodiments of the present invention, as well as equivalents thereof.

One feature of an embodiment of the invention resides broadly in a reamer configured to cut metal comprising: a reamer body; a cutting insert configured to cut metal and also configured to be attached to said reamer body; said cutting insert comprising at least one cutting edge; said reamer body being configured to receive said cutting insert; said reamer body comprising a hole therein; said cutting insert comprising a hole therein; a screw and a nut combination, upon screwing on of said nut on said screw, being configured to be disposed in said hole in said reamer body and in said hole in said cutting insert; a feed mechanism configured to push said cutting insert back and forth radially on said reamer body to adjust said position of said at least one cutting edge; said reamer body being configured to receive said feed mechanism; said feed mechanism being configured to be attached to said reamer body; said screw and said nut combination, upon screwing on of said nut on said screw, being configured to pivot within at least one of: said hole in said reamer body and said hole in said cutting insert, to permit said cutting insert to be moved, radially with respect to said reamer body, by said feed mechanism; said screw and said nut combination, upon screwing on of said nut on said screw, being configured to hold said cutting insert with respect to said reamer body during cutting of a work piece by said at least one cutting edge; said at least one of: said hole in said reamer body and said hole in said cutting insert, being configured to permit said screw and said nut combination, upon screwing on of said nut on said screw, to pivot with respect to said reamer body within at least one of said hole in said reamer body and said hole in said cutting insert.

The appended drawings in their entirety, including all dimensions, proportions and/or shapes in at least one embodiment of the invention, are accurate and are hereby included by reference into this specification.

Another feature of an embodiment of the invention resides broadly in a cutting tool configured to cut metal comprising: a tool body; a cutting insert configured to cut metal and also configured to be attached to said tool body; said cutting insert comprising at least one cutting edge; said tool body being configured to receive said cutting insert; said tool body comprising a hole therein; said cutting insert comprising a hole therein; a screw and a nut combination, upon screwing on of said nut on said screw, being configured to be disposed in said hole in said tool body and in said hole in said cutting insert; a feed mechanism configured to push said cutting insert back and forth radially on said tool body to adjust said position of said at least one cutting edge; said tool body being configured to receive said feed mechanism; said feed mechanism being configured to be attached to said tool body; said screw and said nut combination, upon screwing on of said nut on said screw, being configured to pivot within at least one of: said hole in said tool body and said hole in said cutting insert, to permit said cutting insert to be moved, radially with respect to said tool body, by said feed mechanism; said screw and said nut combination, upon screwing on of said nut on said screw, being configured to hold said cutting insert with respect to said tool body during cutting of a work piece by said at least one cutting edge; said at least one of: said hole in said tool body and said hole in said cutting insert, being configured to permit said screw and said nut combination, upon screwing on of said nut on said screw, to pivot within at least one of said hole in said tool body and said hole in said cutting insert.

All, or substantially all, of the components and methods of the various embodiments may be used with at least one embodiment or all of the embodiments, if more than one embodiment is described herein.

Still another feature of an embodiment of the invention resides broadly in a cutting tool with a tool shank (1) which supports a cutting insert in the form of a perforated plate (3), in particular a disposable perforated plate made of a hard cutting material, e.g. tungsten carbide or oxide ceramic, with a feed device (11) that acts transverse to the axis (10) of the hole in the feed direction (9) on the perforated plate (3) as an adjustment means for the positioning of the perforated plate (3) on the tool shank (1), and with a screw (17) that projects through the plate hole (19) of the perforated plate and with its screw head (23) braces the perforated plate (3) against a contact surface (5) on the tool shank (1) and, projecting through a bolt hole (22) of the tool shank (1), is engaged with its screw thread (20) in the nut thread (21) of a retaining lock nut (18), which retaining lock nut (18) is supported on the side facing away from the perforated plate seat (4) against the screw pressure (15) and so that it cannot rotate around the screw axis (10) on the tool shank, whereby the mutual stop surfaces of the screw head (23) and the perforated plate (3) on the one hand and of the retaining lock nut (18) and tool shank (1) on the other hand, as a result of their shapes, permit a mobility that follows the feed movement, in particular a rotational mobility of the screw fastener means that are fastened to each other (screw 17; retaining lock nut 18) with respect to the tool shank (1) and with respect to the perforated plate (3).

Another feature of an embodiment of the invention resides broadly in a cutting tool characterized by a plane of rotational movement defined approximately by the feed direction (9) of the adjustment means (11) and the screw thread axis (10).

All of the patents, patent applications or patent publications, which were cited in the International Search Report for International Application No. PCT/EP 01/10945, dated Feb. 12, 2002, and/or cited elsewhere are hereby incorporated by reference as if set forth in their entirety herein as follows: DE 25 27 413 A, published on Dec. 23, 1976; and FR 1 249 497 A, published on Dec. 30, 1960.

Yet another feature of an embodiment of the invention resides broadly in a cutting tool characterized by the fact that the screw head (23) with its flanks (31) that taper in the insertion direction (15) apply pressure to the external surface of the plate hole (19), the inside diameter of which tapers in the insertion direction (15), whereby at least one of the mutual contact surfaces (flank 31; external surface of the plate hole 19) is concave.

Still another feature of an embodiment of the invention resides broadly in a cutting tool characterized by the fact that the head (24) of the retaining lock nut (18), with its peripheral flanks (34) that taper in the tightening direction (33) of the nut thread (21), presses against an annular shoulder (35) of the bolt hole (22) of the tool shank (1), whereby at least one of the mutual contact surfaces (34, 36) is concave.

The corresponding foreign and international patent publication applications, namely, Federal Republic of Germany Patent Application No. 100 47 079.3, filed on Sep. 22, 2000, having inventor(s) HORST JÄGER and BERTHOLD ZEUG, and DE-OS 100 47 079.3 and DE-PS 100 47 079.3, and International Patent Application No. PCT/EP01/10945, filed on Sep. 21, 2001 and having inventors HORST JÄGER and BERTHOLD ZEUG, as well as their published equivalents, and other equivalents or corresponding applications, if any, in corresponding cases in the Federal Republic of Germany and elsewhere, and the references and documents cited in any of the documents cited herein, such as the patents, patent applications and publications, are hereby incorporated by reference as if set forth in their entirety herein.

Another feature of an embodiment of the invention resides broadly in a cutting tool characterized by the fact that the retaining lock nut (18) is recessed with a loose fit in the bolt hole (22) of the tool shank (1).

Yet another feature of an embodiment of the invention resides broadly in a cutting tool characterized by the fact that the retaining lock nut (18) can be mounted movably in the bolt hole (22) of the tool shank (1) transverse to its bracing direction (33) in or opposite to the feed direction (9) of the perforated plate (3).

Still another feature of an embodiment of the invention resides broadly in a cutting tool characterized by the fact that at least one flat flank of the retaining lock nut (18) that is approximately parallel to the screw thread axis (10) is tangent to a rotational guide plane (29, 30) which forms an external surface area of the bolt hole (22).

The invention as described hereinabove in the context of the preferred embodiments is not to be taken as limited to all of the provided details thereof, since modifications and variations thereof may be made without departing from the spirit and scope of the invention.

Another feature of an embodiment of the invention resides broadly in a cutting tool characterized by the fact that the mating flanks (36) of stop projections (35) that are in contact with the head (24) of the retaining lock nut (18), of stop projections (35) that project approximately radially into the bolt hole (22) are inclined in the stop direction (33) of the nut thread (21) of the retaining lock nut (18) toward the center axis of the bolt hole (22) and toward the axis of the plate hole (10).

The details in the patents, patent applications and publications may be considered to be incorporable, at applicant's option, into the claims during prosecution as further limitations in the claims to patentably distinguish any amended claims from any applied prior art.

Yet another feature of an embodiment of the invention resides broadly in a cutting tool characterized by a spring element (37) that presses the retaining lock nut (18) opposite to and/or in the direction of pressure (9) of the feed device (11).

Still another feature of an embodiment of the invention resides broadly in a cutting tool characterized by the fact that the spring element (37) is supported with its end opposite the head (24) of the retaining lock nut (18) on the external surface of the bolt hole (22) of the tool shank (1).

Another feature of an embodiment of the invention resides broadly in a cutting tool characterized by a rubber-like molding that serves as the spring element (37).

Yet another feature of an embodiment of the invention resides broadly in a cutting tool characterized by the fact that the spring element (37) is fixed to the retaining lock nut (18) approximately in the manner of an attached ring or ring segment.

Still another feature of an embodiment of the invention resides broadly in a cutting tool characterized by the fact that the spring element (37) is positioned, on the side of the contact projections (35) facing away from the head (24) of the retaining lock nut (18), in the bolt hole (22) of the tool shank (1).

A possible embodiment of the present invention could possibly be utilized for finishing cylinders in internal combustion engines.

Some examples of reamers which may possibly be utilized or adapted for use in at least one possible embodiment of the present invention may possibly be found in the following U.S. Pat. No. 6,494,272, entitled "Drilling system utilizing eccentric adjustable diameter blade stabilizer and winged reamer;" U.S. Pat. No. 6,206,617, entitled "Reamer with guide surface and method of finishing hole by using the same;" U.S. Pat. No. 5,906,458, entitled "Reamer with clamping arrangement for adjustable cutting insert;" U.S. Pat. No. 5,217,333, entitled "Adjustable reamer;" U.S. Pat. No. 4,099,889, entitled "Reamer;" U.S. Pat. No. 4,040,765, entitled "Reamer;" U.S. Pat. No. 6,343,902 entitled, "Reamer and method of using the same;" U.S. Pat. No. 6,206,617, entitled "Reamer with guide surface and method of finishing hole by using the same;" U.S. Pat. No. 5,921,728, entitled "Reamer with radial relief and cutting land;" U.S. Pat. No. 4,997,322, entitled "Automobile body reamer tool;" U.S. Pat. No. 4,555,205, entitled "Reamer holding device for machining valve seats;" U.S. Pat. No. 4,231,693, entitled "Reamer with radial relief;" and U.S. Pat. No. 3,934,448, entitled "Racked pipe reamer."

Some examples of milling cutters which may possibly be utilized or adapted for use in at least one possible embodiment of the present invention may possibly be found in the following U.S. Pat. No. 6,508,612, entitled "Milling cutter capable of using inserts of various geometrical shapes;" U.S. Pat. No. 6,374,712, entitled "Disk milling cutter and suitable indexable insert;" U.S. Pat. No. 5,542,795, entitled "Plunge and face milling cutter with universal insert seats;" U.S. Pat.

No. 5,388,932, entitled "Cutting insert for a milling cutter;" and U.S. Pat. No. 6,056,485, entitled "Ramp plunge and feed milling cutter."

An example of a shaper which may possibly be utilized or adapted for use in at least one possible embodiment of the present invention may possibly be found in U.S. Pat. No. 5,199,829, entitled "Dovetail shaper metal-cutting tool."

A brief abstract of the technical disclosure in the specification must commence on a separate sheet, preferably following the claims, under the heading "Abstract of the Disclosure." The purpose of the abstract is to enable the Patent and Trademark Office and the public generally to determine quickly from a cursory inspection the nature and gist of the technical disclosure,. The abstract shall not be used for interpreting the scope of the claims. Therefore, the abstract is not intended to limit the claims in any manner and should not be interpreted as limiting the claims in any manner.

The invention claimed is:

1. A cutting tool with a tool shank which supports a cutting insert in the form of a disposable perforated plate comprising a hard cutting material comprising one of: tungsten carbide or oxide ceramic,
with a feed device that acts transverse to the axis of a hole in the perforated plate in the feed direction on the perforated plate as an adjustment means for the positioning of the perforated plate on the tool shank, and
with a screw that projects through the plate hole of the perforated plate and with its screw head braces the perforated plate against a contact surface on the tool shank and, projecting through a bolt hole of the tool shank, is engaged with its screw thread in the nut thread of a retaining lock nut, which screw and retaining lock nut together form a screw fastener means,
which retaining lock nut is supported on the side facing away from the perforated plate seat against the screw pressure and so that it cannot rotate around the screw axis on the tool shank,
mutual stop surfaces of the screw head and the perforated plate on the one hand and of the retaining lock nut and tool shank on the other hand, as a result of their shapes, permit a mobility that follows the feed movement to provide a rotational mobility of the screw fastener means with respect to the tool shank and with respect to the perforated plate;
a plane of rotational movement is defined approximately by the feed direction of said feed device and the axis of said bolt hole;
said screw head comprises flanks that taper along the direction in which said screw head is inserted into the plate hole;
said flanks are configured to contact and apply pressure to the interior surface of said plate hole;
the inside diameter of said plate hole tapers in the insertion direction of said screw head;
at least one of: said flanks and the interior surface of said plate hole have a concave surface;
said retaining lock nut comprises a head portion having flanks that taper in the tightening direction of the screw threads of said retaining lock nut;
said bolt hole has an annular shoulder;
said flanks of said head portion of said retaining lock nut are configured to press against said annular shoulder of said bolt hole; and
at least one of: said flanks and said annular shoulder have a concave surface.

2. The cutting tool according to claim 1, wherein said retaining lock nut is recessed with a loose fit in said bolt hole of said tool shank, and said retaining lock nut can be mounted movably in said bolt hole of said tool shank transverse to its bracing direction in or opposite to the feed direction of said perforated plate.

3. The cutting tool according to claim 2, wherein:
at least one flat flank of said retaining lock nut that is approximately parallel to the axis of said bolt hole is tangent to a rotational guide plane which forms an interior surface area of said bolt hole;
said screw fastening means comprises a spring element configured to press said retaining lock nut opposite to and/or in the direction of pressure of said feed device;
said spring element is supported with its end opposite said head of said retaining lock nut on the interior surface of said bolt hole of said tool shank;
said spring element comprises an elastic molding; and
said spring element is fixed to said retaining lock nut approximately in the manner of an attached ring or ring segment.

4. The cutting tool according to claim 1, wherein:
said bolt hole comprises stop projections having mating flanks that are in contact with said head of said retaining lock nut;
said mating flanks are inclined in a stop direction of said nut thread of said retaining lock nut toward the axis of said bolt hole and toward the axis of said plate hole;
said screw fastening means comprises a spring element configured to press said retaining lock nut opposite to and/or in the direction of pressure of said feed device;
said spring element is supported with its end opposite said head of said retaining lock nut on the interior surface of said bolt hole of said tool shank;
said spring element comprises an elastic molding; and
said spring element is fixed to said retaining lock nut approximately in the manner of an attached ring or ring segment.

5. A cutting tool configured to cut metal comprising:
a tool body;
a cutting insert being configured to cut metal and being configured to be attached to said tool body;
said cutting insert comprising at least one cutting edge;
said tool body being configured to receive said cutting insert;
said tool body comprising a hole therein;
said cutting insert comprising a hole therein;
a screw and a nut combination, upon screwing together of said nut and said screw, being configured to be disposed in said hole in said tool body and in said hole in said cutting insert;
a feed mechanism being configured to push said cutting insert away from a central portion of said tool body to adjust said position of said at least one cutting edge;
said tool body being configured to receive said feed mechanism;
said feed mechanism being configured to be attached to said tool body;
said screw and said nut combination, upon screwing together of said nut and said screw, being configured to pivot within at least one of:
said hole in said tool body and
said hole in said cutting insert, to permit said cutting insert to be moved, outwardly with respect to said tool body, by said feed mechanism;
said screw and said nut combination, upon screwing together of said nut and said screw, being configured to hold said cutting insert with respect to said tool body during cutting of a work piece by said at least one cutting edge;
said at least one of:
said hole in said tool body and
said hole in said cutting insert, being configured to permit said screw and said nut combination, upon screwing together of said nut and said screw, to pivot within at least one of: said hole in said tool body and said hole in said cutting insert;
said screw and said nut combination is configured to pivot within both of said hole in said tool body and said hole in said cutting insert simultaneously; and
said hole in said tool body and said hole in said cutting insert are each configured to permit said screw and said nut combination to pivot within both of said hole in said tool body and said hole in said cutting insert simultaneously.

6. The cutting tool according to claim 5, wherein a plane of pivoting movement of said screw and nut combination is defined approximately by the feed direction of said feed mechanism and the axis of said hole in said tool body.

7. The cutting tool according to claim 6, wherein:
said screw comprises a screw head;
said screw head comprises flanks that taper along the direction in which said screw head is inserted into said hole in said cutting insert;
said flanks are configured to contact and apply pressure to the interior surface of said hole in said cutting insert;
the inside diameter of said hole in said cutting insert tapers in the insertion direction of said screw head; and
at least one of: said flanks and the interior surface of said hole in said cutting insert have a concave surface.

8. The cutting tool according to claim 7, wherein:
said retaining lock nut comprises a head portion having flanks that taper in the tightening direction of the screw threads of said retaining lock nut;
said hole in said tool body has an annular shoulder;
said flanks of said head portion of said retaining lock nut are configured to press against said annular shoulder of said hole in said tool body; and
at least one of: said flanks and said annular shoulder have a concave surface.

9. The cutting tool according to claim 8, wherein:
said retaining lock nut is recessed with a loose fit in said hole in said tool body; and
said retaining lock nut can be mounted movably in said hole in said tool body transverse to its bracing direction in or opposite to the feed direction of said cutting insert.

10. The cutting tool according to claim 9, wherein:
at least one flat flank of said retaining lock nut that is approximately parallel to the axis of said hole in said tool body is tangent to a rotational guide plane which forms an interior surface area of said hole in said tool body;
said screw and nut combination comprises a spring element configured to press said retaining lock nut opposite to and/or in the direction of pressure of said feed device;
said spring element is supported with its end opposite said head of said retaining lock nut on the interior surface of said hole in said tool body;
said spring element comprises an elastic molding; and
said spring element is fixed to said retaining lock nut approximately in the manner of an attached ring or ring segment.

11. The cutting tool according to claim 8, wherein:
said hole in said tool body comprises stop projections having mating flanks that are in contact with said head of said retaining lock nut;
said mating flanks are inclined in a stop direction of said nut thread of said retaining lock nut toward the axis of said hole in said tool body and toward the axis of said hole in said cutting insert;
said screw and nut combination comprises a spring element configured to press said retaining lock nut opposite to and/or in the direction of pressure of said feed device;
said spring element is supported with its end opposite said head of said retaining lock nut on the interior surface of said hole in said tool body of said tool shank;
said spring element comprises an elastic molding; and
said spring element is fixed to said retaining lock nut approximately in the manner of an attached ring or ring segment.

12. A cutting tool configured to cut metal comprising:
a tool body;
a cutting insert being configured to cut metal and being configured to be attached to said tool body;
said cutting insert comprising at least one cutting edge;
said tool body being configured to receive said cutting insert;
said tool body comprising a hole therein;
said cutting insert comprising a hole therein;
a screw and a nut combination, upon screwing together of said nut and said screw, being configured to be disposed in said hole in said tool body and in said hole in said cutting insert;
a feed mechanism being configured to push said cutting insert away from a central portion of said tool body to adjust said position of said at least one cutting edge;
said tool body being configured to receive said feed mechanism;
said feed mechanism being configured to be attached to said tool body;
said screw and said nut combination, upon screwing together of said nut and said screw, being configured to pivot within at least one of:
said hole in said tool body and
said hole in said cutting insert, to permit said cutting insert to be moved, outwardly with respect to said tool body, by said feed mechanism;
said screw and said nut combination, upon screwing together of said nut and said screw, being configured to hold said cutting insert with respect to said tool body during cutting of a work piece by said at least one cutting edge;
said at least one of:
said hole in said tool body and
said hole in said cutting insert, being configured to permit said screw and said nut combination, upon screwing together of said nut and said screw, to pivot within at least one of: said hole in said tool body and said hole in said cutting insert;
said screw and nut combination comprises a spring element configured to press said retaining lock nut opposite to and/or in the direction of pressure of said feed device;
said spring element is supported on the interior surface of said hole in said tool body;
said spring element comprises an elastic molding; and said spring element is fixed to said retaining lock nut approximately in the manner of an attached ring or ring segment.

13. The cutting tool according to claim 12, wherein:

said screw and said nut combination is configured to pivot within both of said hole in said tool body and said hole in said cutting insert simultaneously; and said hole in said tool body and said hole in said cutting insert are each configured to permit said screw and said nut combination to pivot within both of said hole in said tool body and said hole in said cutting insert simultaneously.

14. A cutting tool comprising:

a cutting insert comprising a disposable perforated plate comprising a hard cutting material comprising one of: tungsten carbide or oxide ceramic;

a tool shank being configured and disposed to support said cutting insert thereon in a cutting insert seat;

a feed device being configured to act transversely to the axis of a hole in said cutting insert in the feed direction on said cutting insert as an adjustment means for the positioning of said cutting insert on said tool shank;

a screw being configured and disposed to project through said hole in said cutting insert;

said screw comprising a screw head being configured and disposed to brace said cutting insert against a contact surface of said cutting insert seat on said tool shank;

a retaining lock nut comprising an internal nut thread;

said screw being configured and disposed to project through a bolt hole of said tool shank and engage with its screw thread in the internal nut thread of said retaining lock nut, which screw and retaining lock nut together form a screw fastener arrangement;

said retaining lock nut being supported on the side of said tool shank facing away from said cutting insert seat against the direction of the screw pressure and such that said retaining lock nut cannot rotate around an axis of said screw;

said screw head and said cutting insert comprising corresponding stop surfaces;

said retaining lock nut and said tool shank comprising corresponding stop surfaces;

each of said stop surfaces being configured and disposed to permit pivoting of said screw fastener arrangement that follows the feed movement to permit said screw fastener arrangement to pivot with respect to both said tool shank and said cutting insert;

a plane of pivoting movement of said screw fastener arrangement is defined approximately by the feed direction of said feed mechanism and the axis of said hole in said tool shank;

said screw comprises a screw head;

said screw head comprises flanks that taper along the direction in which said screw head is inserted into said hole in said cutting insert;

said flanks are configured to contact and apply pressure to the interior surface of said hole in said cutting insert;

the inside diameter of said hole in said cutting insert tapers in the insertion direction of said screw head;

at least one of: said flanks and the interior surface of said hole in said cutting insert have a concave surface;

said retaining lock nut comprises a head portion having flanks that taper in the tightening direction of the screw threads of said retaining lock nut;

said hole in said tool shank has an annular shoulder;

said flanks of said head portion of said retaining lock nut are configured to press against said annular shoulder of said hole in said tool shank;

at least one of: said flanks and said annular shoulder have a concave surface;

said retaining lock nut is recessed with a loose fit in said hole in said tool shank; and said retaining lock nut can be mounted movably in said hole in said tool shank transverse to its bracing direction in or opposite to the feed direction of said cutting insert.

15. The cutting tool according to claim 14, wherein:

said cutting tool comprises a reamer;

at least one flat flank of said retaining lock nut that is approximately parallel to the axis of said hole in said tool shank is tangent to a rotational guide plane which forms an interior surface area of said hole in said tool shank;

said screw fastener arrangement comprises a spring element configured to press said retaining lock nut opposite to and/or in the direction of pressure of said feed device;

said spring element is supported with its end opposite said head of said retaining lock nut on the interior surface of said hole in said tool shank;

said spring element comprises an elastic molding; and said spring element is fixed to said retaining lock nut approximately in the manner of an attached ring or ring segment.

16. The cutting tool according to claim 14, wherein:

said cutting tool comprises a reamer;

said hole in said tool shank comprises stop projections having mating flanks that are in contact with said head of said retaining lock nut;

said mating flanks are inclined in a stop direction of said nut thread of said retaining lock nut toward the axis of said hole in said tool shank and toward the axis of said hole in said cutting insert;

said screw fastener arrangement comprises a spring element configured to press said retaining lock nut opposite to and/or in the direction of pressure of said feed device;

said spring element is supported with its end opposite said head of said retaining lock nut on the interior surface of said hole in said tool shank of said tool shank;

said spring element comprises an elastic molding; and said spring element is fixed to said retaining lock nut approximately in the manner of an attached ring or ring segment.

* * * * *